United States Patent [19]
Nakazato

[11] Patent Number: 4,558,680
[45] Date of Patent: Dec. 17, 1985

[54] SYSTEM FOR CONTROLLING THE AIR-FUEL RATIO SUPPLIED TO A SUPERCHARGED ENGINE

[75] Inventor: Kazuo Nakazato, Fuchu, Japan

[73] Assignee: Fuji Jukogyo Kabushiki Kaisha, Tokyo, Japan

[21] Appl. No.: 579,066

[22] Filed: Feb. 10, 1984

[30] Foreign Application Priority Data

Feb. 14, 1983 [JP] Japan ................. 58-022566

[51] Int. Cl.⁴ .............................................. F02M 7/12
[52] U.S. Cl. .................................... 123/559; 123/437; 261/DIG. 51
[58] Field of Search .................. 123/437, 438, 559; 60/605; 261/121 B, DIG. 51

[56] References Cited

U.S. PATENT DOCUMENTS

| | | | |
|---|---|---|---|
| 2,070,009 | 2/1937 | Goodman | 123/437 |
| 3,674,245 | 7/1972 | Massarotti | 261/DIG. 51 |
| 4,142,494 | 3/1979 | Negri et al. | 60/605 |

FOREIGN PATENT DOCUMENTS

| | | | |
|---|---|---|---|
| 164741 | 12/1980 | Japan | 123/438 |
| 156233 | 12/1980 | Japan | 261/DIG. 51 |

Primary Examiner—Michael Koczo
Attorney, Agent, or Firm—Martin A. Farber

[57] ABSTRACT

A system for controlling the air-fuel ratio for an engine comprises a first passage for communicating a portion adjacent to an inlet of an air bleed of a carburetor of the engine with a portion of the intake passage between an air-cleaner and a supercharger, a valve provided in the first passage, an actuator comprising a diaphragm operatively connected to the valve and first and second chambers defined by the diaphragm. A second passage is provided for communicating the first chamber with the intake passage at the upstream side of the inlet of the air bleed, and a third passage is provided for communicating the second chamber with the intake passage at the downstream side of a throttle valve of the engine. The actuator is so arranged that the valve opens when the difference between pressures in the first and second chambers exceeds a predetermined value, thereby supplying rich air-fuel mixture.

10 Claims, 4 Drawing Figures

SYSTEM FOR CONTROLLING THE AIR-FUEL RATIO SUPPLIED TO A SUPERCHARGED ENGINE

BACKGROUND OF THE INVENTION

The present invention relates to a system for controlling the air-fuel ratio of mixture supplied to an internal combustion engine having a supercharger for a vehicle.

An air-fuel ratio control system for an engine having a supercharger is disclosed in Japanese patent application laid open No. 55-164741, in which the air-fuel ratio is controlled by supercharging pressure. Such a system has a disadvantage that the air-fuel ratio can not be controlled to a proper value in the entire operational range of the engine, causing problems, for example, deterioration in the driveability of the vehicle.

SUMMARY OF THE INVENTION

The object of the present invention is to provide a system which may properly control the air-fuel ratio supplied to an engine having a supercharger in the entire operation range of the engine, in which the air-fuel ratio is controlled in dependency on the difference between supercharging pressures in a passage at upstream and downstream sides of a carburetor of the supercharged engine.

According to the present invention, there is provided a system for controlling the air-fuel ratio supplied to a combustion engine having an intake passage, an air-cleaner, a carburetor having a main nozzle, an air bleed communicated with the main nozzle and throttle valve, an exhaust passage and a supercharger provided in the intake passage, comprising: a first passage for communicating a portion adjacent to the inlet of said air bleed with a portion of said intake passage between said air-cleaner and said supercharger; a valve provided in said first passage; an actuator comprising a diaphragm operatively connected to said valve and first and second chambers defined by said diaphragm; a second passage for communicating said first chamber with said intake passage at the upstream side of said inlet of said air bleed; a third passage for communicating said second chamber with said intake passage at the downstream side of said throttle valve; said actuator being so arranged that said valve opens when the difference between pressures in said first and second chambers exceeds a predetermined value.

Other objects and features of this invention will be understood from the following description will reference to the accompanying drawings.

DETAILED DESCRIPTION OF THE PREFERRED EMBODIMENT

Figure 1:
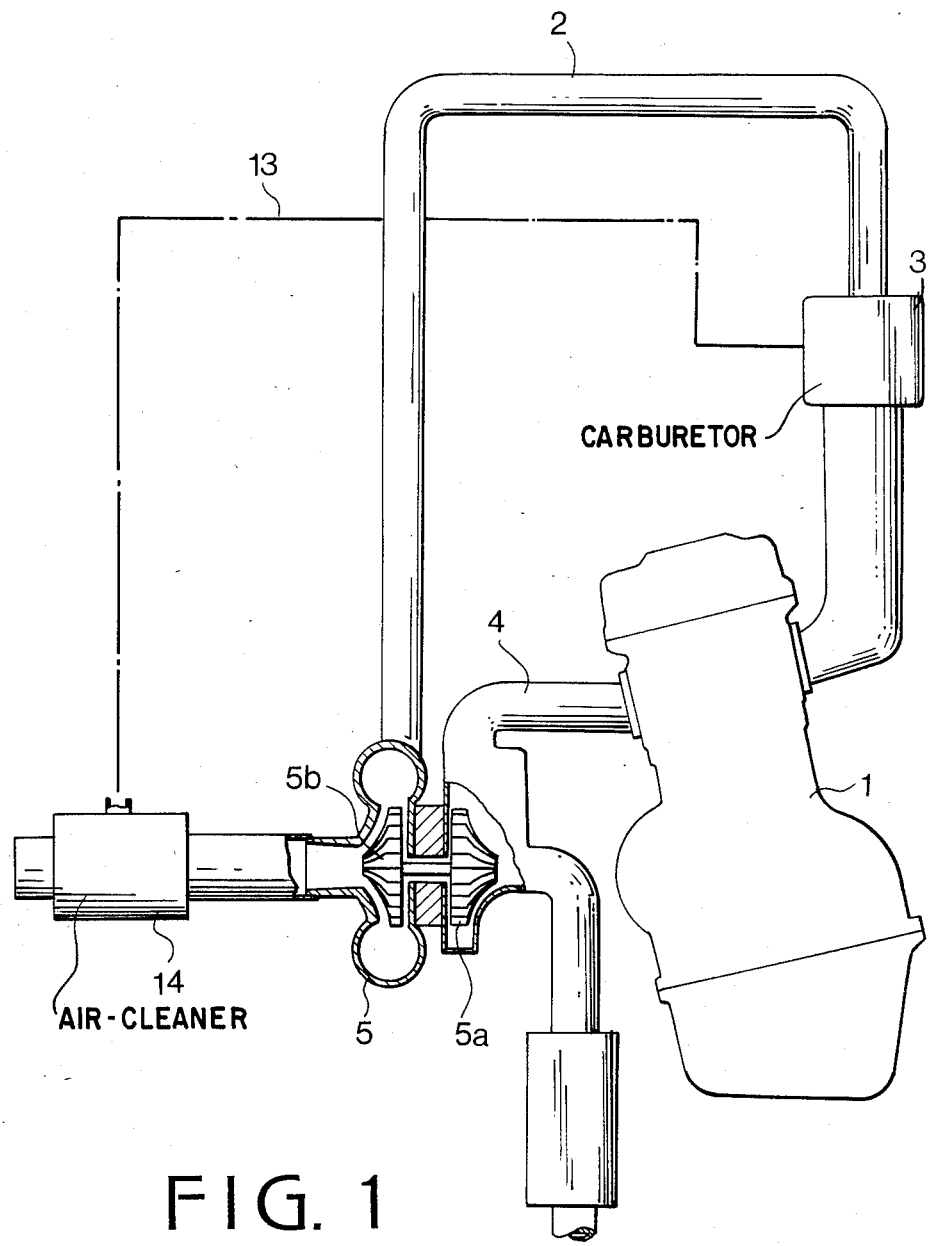
FIG. 1 is a schematic view showing a system according to the present invention.

Referring to FIG. 1, an internal combustion engine 1 is provided with an intake passage 2, a carburetor 3 communicating with the intake passage 2, an exhaust passage 4 from the engine 1 and a turbocharger 5. The turbocharger 5 comprises a turbine 5a provided in the exhaust passage 4 and a compressor 5b provided in the intake passage 2 at the downstream side of an air-cleaner 14.

Figure 2:
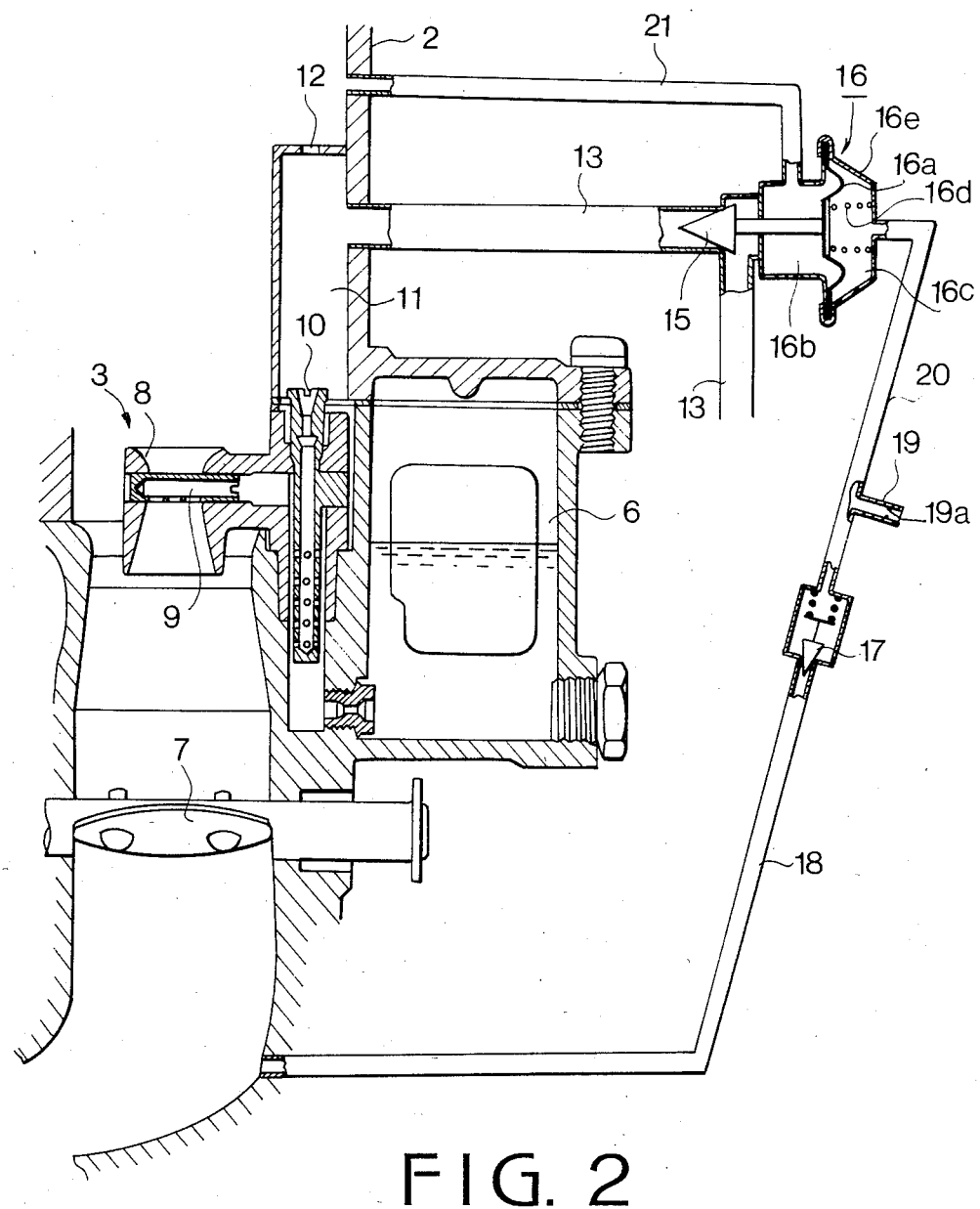
FIG. 2 is a sectional view showing a main portion of the system of FIG. 1.

Referring to FIG. 2, the carburetor 3 for the turbocharged engine comprises a float chamber 6, a throttle valve 7, venturi 8 having a main nozzle 9, and an air bleed 10 communicated with the main nozzle 9. The inlet of the air bleed 10 is communicated with a chamber 11 formed in the intake passage 2. The wall of chamber 11 has an inlet hole 12 for communicating the chamber with the intake passage 2. The chamber 11 is communicated with a portion of the intake passage 2 between the air-cleaner and the turbocharger, preferably with the air-cleaner 14 by a passage 13 having a diameter larger than that of the hole 12. Provided in the passage 13 is a needle valve 15 which is operated by an actuator 16. The actuator comprises a housing 16e, a diaphragm 16a connected to the needle valve 15, chambers 16b and 16c defined by the diaphragm 16a, connected in the housing, and a spring 16d urging the diaphragm toward the side of the needle valve 15 to close it. The chamber 16b is communicated with the intake passage 2 by a passage 21 and chamber 16c communicated with the intake passage 2 at the downstream side of the throttle valve 7 by passages 20 and 18 interposed with a check valve 17. The passage 20 is communicated with the atmosphere through a passage 19 having an orifice 19a.

In operation, when the supercharging pressure applied to chamber 16b is higher than the summation of the pressure in the chamber 16c and the compression force of the spring 16d, the diaphragm 16a deflects to the right to open the needle valve 15. Thus, chamber 11 communicates with the air-cleaner 14, resulting in a decrease of the pressure in the chamber 11. Accordingly, the amount of the bleed air decreases, so that the air-fuel ratio supplied by the carburetor becomes small, and that is a rich mixture. When the difference between supercharging pressures in the intake passage at opposite sides of the throttle valve is smaller than a predetermined value, the needle valve 15 is closed by the diaphragm 16a deflected by the spring 16d. Thus, the pressure in the chamber 11 increases thereby supplying lean air-fuel mixture. When the check valve 17 closes because of low pressure in the downstream side of the throttle valve 7, the pressure in chamber 16c becomes atmospheric pressure due to the communication with the atmosphere through passage 19. Accordingly, operation at the time when the presure at the downstream side of the throttle valve 7 changes from positive to negative and vice versa is securely performed.

Figure 3:
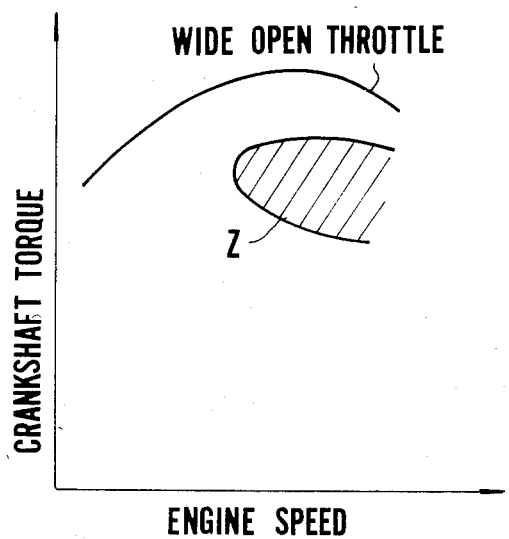
FIG. 3 is a graph showing torque characteristics of a conventional engine.

FIG. 3 shows a torque characteristics of a conventional engine, in which the air-fuel ratio is controlled by only supercharging pressure. In the conventional engine, when the opening degree of the throttle valve is small, the intake air is compressed at the upstream side of the throttle valve by the supercharging pressure, causing an increase of the pressure at the venturi. Accordingly, the amount of fuel induced from the main nozzle in the venturi decreases, which means the supply of extreme lean air-fuel mixture. A zone Z in FIG. 3 is an extreme lean mixture zone. From the graph, it will be understood that in the conventional engine the air-fuel ratio is not controlled to a proper value in the entire speed range of the engine.

Figure 4:
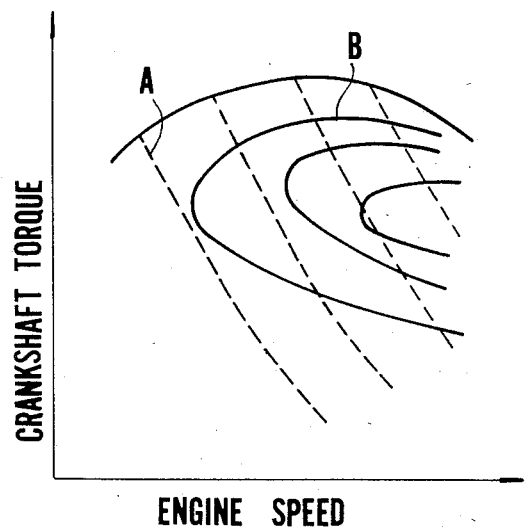
FIG. 4 is a graph showing torque characteristics of an engine according to the present invention.

In FIG. 4, reference A designates a supercharging pressure map (shown by dashed lines) and B shows a pressure difference map (shown by solid line curves) between supercharging pressures at opposite sides of the throttle valve in the system of the present invention. Since the pressure difference map coincides with the zone Z, the air-fuel mixture in the zone A is enriched.

Thus, in accordance with the present invention, the air-fuel ratio can be controlled to a proper value in the entire operational range of an engine, which contributes to fuel economy and improvement in the driveability of vehicles.

While the presently preferred embodiment of the present invention has been shown and described, it is to be understood that this disclosure is for the purpose of illustration and that various charges and modifications may be made without departing from the spirit and scope of the invention as set forth in the appended claims.

What is claimed is:

1. A system for controlling the air-fuel ratio supplied to a combustion engine having an intake passage communicting with the engine, an air-cleaner provided in the intake passage, a carburetor upstream of the engine in the intake passage having a main nozzle, and an air bleed communicated with the main nozzle and a throttle valve in the intake passage downstream of the main nozzle, an exhaust passage communicating with the engine and a supercharger comprising a compressor provided in the intake passage between the air-cleaner and said carburetor, comprising:

a first passage communicating said air bleed adjacent to an inlet of said air bleed with a portion of said intake passage extending from said air-cleaner to said compressor;

valve means provided in said first passage for closing the latter;

an actuator comprising first and second chambers defined by a diaphragm operatively connected to said valve means;

a second passage communicating said first chamber with said intake passage upstream of said inlet of said air bleed;

a third passage communicating said second chamber with said intake passage downstream of said throttle valve; and said actuator being so arranged that said valve means opens said first passage when a difference between pressures in said first and second chambers exceeds a predetermined value.

2. The system for controlling the air-fuel ratio supplied to a combustion engine according to claim 1 further comprising a check valve provided in said third passage, and a fourth passage having an orifice communicating the second chamber with the atmosphere.

3. The system according to claim 2, wherein said check valve checks flow from the second chamber to the intake passage.

4. The system for controlling the air-fuel ratio supplied to a combustion engine according to claim 1 wherein said inlet of said air bleed is communicated with a chamber formed in said intake passage, the chamber being communicated with the intake passage by a hole formed in a wall of the chamber.

5. The system for controlling the air-fuel ratio supplied to a combustion engine according to claim 4 wherein the diameter of said hole is smaller than that of said first passage.

6. The system according to claim 1, wherein said first passage extends to said air-cleaner.

7. In an air-fuel ratio control system for providing an air-fuel mixture to an internal combustion engine having an intake passage, an air-cleaner for cleaning air induced into the engine passing through the intake passage, a carburetor including a venturi provided in the intake passage, a main nozzle opening into the venturi, an air bleed having an inlet portion opening into the intake passage adjacent thereto and another portion communicating with the main nozzle, and a throttle valve operatively disposed in the intake passage downstream of the venturi, and a compressor in the intake passage between the air-cleaner and the carburetor for compressing the induced air passing into the engine through the intake passage, the improvement comprising:

first means for sensing pressure at an upstream side of said venturi, second means for sensing pressure at a downstream side of said throttle valve, third means for decreasing the pressure of induced air adjacent the air bleed when the difference in pressure between the upstream side of said venturi and the downstream side of said throttle valve exceeds a predetermined pressure so as to enrich said air-fuel mixture during operation of said compressor and during a small opening degree of said throttle valve in said intake passage.

8. The air-fuel ratio control system according to claim 7, wherein said third means comprises, a first passage communicating said air bleed adjacent to said inlet portion of said air bleed with said intake passage upstream of said compressor, and valve means for selectively closing said first passage when said pressure difference exceeds said predetermined value.

9. the air-fuel ratio control system according to claim 8, wherein said second means further comprises an actuating means comprising a diaphragm defining a first chamber and a second chamber, said diaphragm is connected with said valve means, said first means communicates said first chamber with said intake passage between said air bleed and said compressor, said third means communicates said second chamber with said intake passage downstream of said throttle valve.

10. The air-fuel ratio control system according to claim 9, further comprising an orifice means for slightly inducing atmosphere into said second chamber, and a check valve means in said second means between said second chamber and said intake passage at said downstream side of said throttle valve for preventing air flow from said orifice means to said intake passage at the downstream side of said throttle valve.

* * * * *